US010084395B2

(12) United States Patent
Banduric

(10) Patent No.: US 10,084,395 B2
(45) Date of Patent: Sep. 25, 2018

(54) COMPLEX ELECTRIC FIELDS AND STATIC ELECTRIC FIELDS TO EFFECT MOTION WITH CONDUCTION CURRENTS

(71) Applicant: Richard Banduric, Aurora, CO (US)

(72) Inventor: Richard Banduric, Aurora, CO (US)

( * ) Notice: Subject to any disclaimer, the term of this patent is extended or adjusted under 35 U.S.C. 154(b) by 0 days.

(21) Appl. No.: 15/422,270

(22) Filed: Feb. 1, 2017

(65) Prior Publication Data

US 2017/0149362 A1    May 25, 2017

Related U.S. Application Data

(63) Continuation-in-part of application No. 15/091,359, filed on Apr. 5, 2016, which is a continuation of application No. 13/543,688, filed on Jul. 6, 2012, now Pat. No. 9,337,752.

(51) Int. Cl.
| | |
|---|---|
| *H02N 11/00* | (2006.01) |
| *H02K 3/02* | (2006.01) |
| *H02K 3/30* | (2006.01) |
| *H02K 3/04* | (2006.01) |
| *B64G 1/40* | (2006.01) |

(52) U.S. Cl.
CPC ........... *H02N 11/006* (2013.01); *B64G 1/409* (2013.01); *H02K 3/02* (2013.01); *H02K 3/04* (2013.01); *H02K 3/30* (2013.01); *H02N 11/008* (2013.01)

(58) Field of Classification Search
USPC .................................. 318/558; 310/308, 309
See application file for complete search history.

(56) References Cited

U.S. PATENT DOCUMENTS

| | | | |
|---|---|---|---|
| 1,974,483 A | 9/1934 | Brown | |
| 2,949,550 A | 8/1960 | Brown | |
| 3,018,394 A | 1/1962 | Brown | |
| 3,022,430 A | 2/1962 | Brown | |
| 3,187,206 A | 6/1965 | Brown | |
| 3,196,296 A | 7/1965 | Brown | |
| 3,591,826 A * | 7/1971 | Valles | H05B 6/666 219/761 |

(Continued)

FOREIGN PATENT DOCUMENTS

| | | |
|---|---|---|
| EP | 0436405 | 7/1991 |
| EP | 0485243 | 5/1992 |
| GB | 300311 | 11/1928 |

OTHER PUBLICATIONS

Bahder, Thomas B. et al., "Force on an Asymmetric Capacitor", Army Research Laboratory, Adelphi, MD, Mar. 2003, 34 pp.

(Continued)

*Primary Examiner* — Bentsu Ro
(74) *Attorney, Agent, or Firm* — Trenner Law Firm, LLC; Mark D. Trenner

(57) ABSTRACT

In an example, a method includes interacting electric fields from charges in conductors in different inertial reference frames to effect motion. The example method implements the mathematical framework that divides electric fields from charges in different inertial reference frames into separate electric field equations in electrically isolated conductors. The example method may implement the interaction of these electric fields to produce a force on an assembly that can, by way of illustration, propel a spacecraft using electricity without other propellant(s).

19 Claims, 11 Drawing Sheets

(56) References Cited

U.S. PATENT DOCUMENTS

| | | | | |
|---|---|---|---|---|
| 3,596,135 | A | * | 7/1971 | Stenger, Jr. .......... H02H 1/0015 361/38 |
| 3,610,971 | A | | 10/1971 | Hooper |
| 3,656,013 | A | | 4/1972 | Hooper |
| 3,722,285 | A | | 3/1973 | Weber |
| 3,760,265 | A | * | 9/1973 | Hutch .................... G01K 7/026 324/111 |
| 3,916,691 | A | * | 11/1975 | Hollander ................ G01K 7/13 324/435 |
| 4,224,540 | A | * | 9/1980 | Okubo .................... G01D 5/12 307/400 |
| 4,463,825 | A | * | 8/1984 | Lerwill .................. H04R 23/00 181/113 |
| 4,642,504 | A | | 2/1987 | Jacobsen |
| 5,054,081 | A | | 10/1991 | West |
| 5,845,220 | A | | 12/1998 | Puthoff |
| 5,949,311 | A | * | 9/1999 | Weiss .................... H01P 1/215 333/202 |
| 6,411,493 | B2 | | 6/2002 | Campbell |
| 7,078,994 | B2 | * | 7/2006 | Martin .................... G21K 5/04 336/180 |
| 7,602,181 | B1 | | 10/2009 | Gerald, II et al. |
| 8,053,948 | B2 | | 11/2011 | Suzuki et al. |
| 9,337,752 | B2 | | 5/2016 | Banduric |
| 2005/0197808 | A1 | | 9/2005 | Kuo |
| 2007/0034514 | A1 | | 2/2007 | Riera |
| 2007/0213954 | A1 | | 9/2007 | Price |
| 2009/0085411 | A1 | | 4/2009 | Qiang |
| 2012/0119857 | A1 | | 5/2012 | Nassikas |
| 2012/0119885 | A1 | | 5/2012 | Nassikas |
| 2014/0009098 | A1 | | 1/2014 | Banduric |
| 2016/0218644 | A1 | | 7/2016 | Banduric |

OTHER PUBLICATIONS

Canning, Francis X., et al., "Asymmetrical Capacitors for Propulsion", Institute for Scientific Research, Inc.; Fairmount, West Virginia, Oct. 2004, 23 pp.

Moon, Parry, et al., "The Coulomb Force and the Ampere Force", Apr. 1954, 11 pp.

Hooper, William J., "New Horizons in Electric, Magnetic & Gravitational Field Theory", http://www.rexresearch.com/hooper/horizon.htm; 52 pp.

Hartman, James E., "A Review of William J. Hooper and his All-Electric Motional Electric Field Generator", http://www.rexresearch.com/hooper/hooper1.htm; Feb. 2, 1996; 4 pp.

Drury, David M., "The Unification of the Lorentz and Coulomb Gauges of Electromagnetic Theory", IEEE Transactions on Education, vol. 43, No. 1, Feb. 2000, 4 pp.

Klicker, Kyle A., "Motional Electric Fields Associated with Relative Moving Charge", 1986. 67 pp.

Biefeld-Brown effect located at http://en.wikipedia.org/wiki/Biefeld%E2%80%93Brown_effect, 5 pp.

Written Opinion of the International Searching Authority in PCT/US2013/048410 dated Jan. 6, 2015, 5 pages.

International Search Report and Written Opinion dated Sep. 25, 2013 in PCT/US2013/048410, 9 pages.

K.J. Van Vlaenderen and A. Waser; Generalisation of Classical Electrodynamics to Admit a Scalar Field and Longitudinal Waves; Hardonic Journal 24, 609-628 (2001).

A.K.T. Assis and Marcelo Bueno; Longitudinal Forces in Weber's Electrodynamics; International Journal of Modern Physics B, vol. 9, No. 28 (1995)3689-3969.

Lars Johansson; Longitudinal Electrodynamic Forces and their Possible Technological Applications; Master of Science Thesis; Lund Institute of Technology, Sweden (1996).

European Patent Office Action for Application No. 13812604.0, dated Jan. 14, 2016, 3 pp.

Extended European Search Report for Application No. 13812604.0, dated Apr. 20, 2016, 8 pp.

Theoretical and Mathematical Description Including an in-depth Analysis of Relativistic Electric Fields and the Methods to Effect Motion in New Electrodynamics journal, by Richard Banduric, dated Dec. 21, 2012, 118 pages.

Gradient, Divergence, Curl and Related Formulae, 24 pages, date as best can be determined from www.bolvan.ph.utexas.edu/~vadim/classes/17f for the PDF document diffop.pdf (see printout at end of NPL reference uploaded herewith) is "last updated Sep. 12, 2017".

Lecture 3—Moving Charges, Electric Conduction, Current, Resistance, Metals and Semiconductors, dated May 27, 2011, 43 pages.

Electrical Conduction in Metals and Semiconductors, by Safa Kasap et al., dated Feb. 14, 2017, 28 pages.

Extended European Search in EPO Patent Application No. 18154781.1-1201, dated Jun. 14, 2018, 7 pages.

* cited by examiner

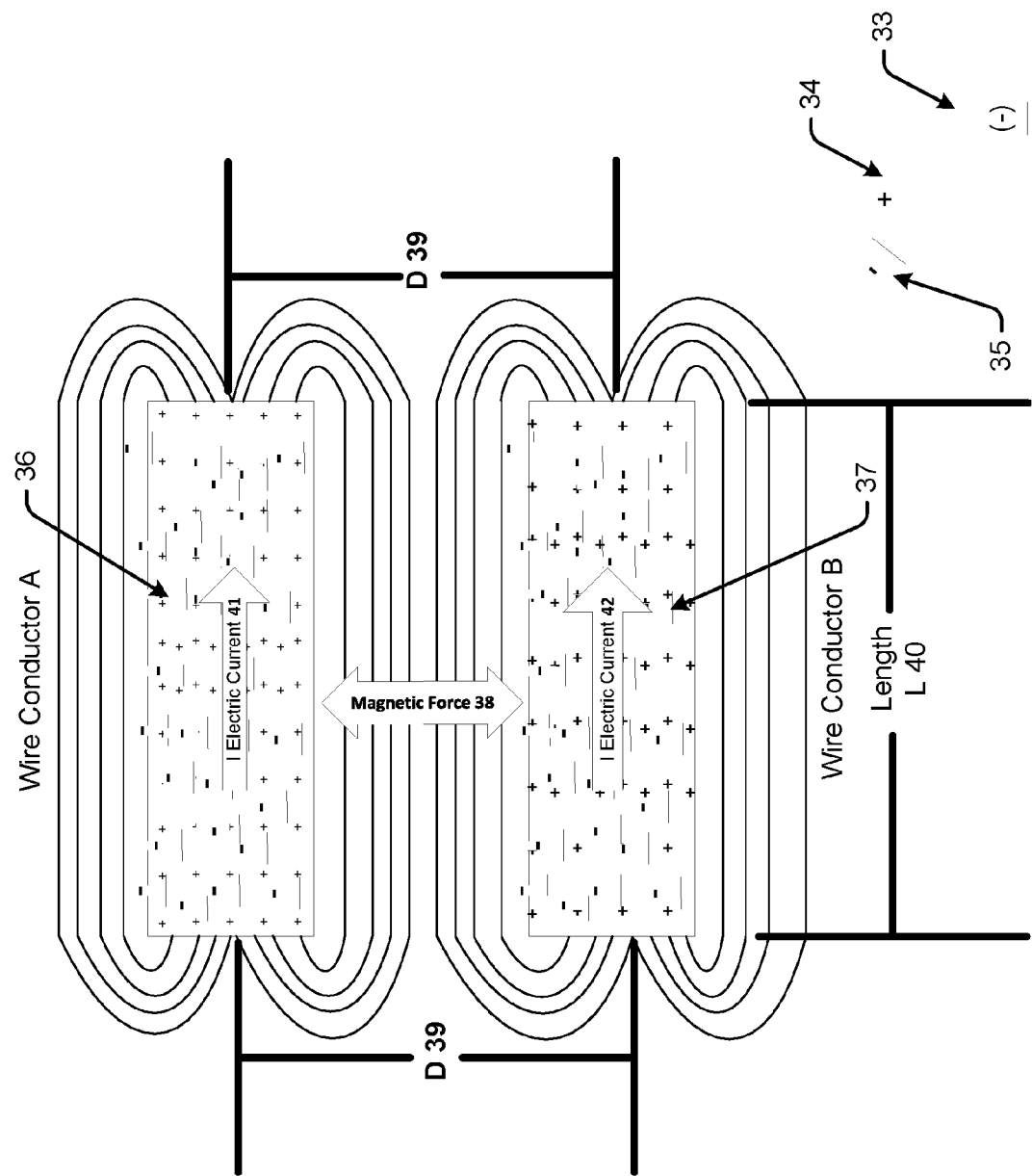

COMPLEX ELECTRIC FIELDS AND STATIC ELECTRIC FIELDS TO EFFECT MOTION WITH CONDUCTION CURRENTS

PRIORITY CLAIM

This application is a continuation-in-part of U.S. patent application Ser. No. 15/091,359 titled "Interacting Complex Electric Fields and Static Electric Fields To Effect Motion" of Richard Banduric filed Apr. 5, 2016 which is a continuation of U.S. patent application Ser. No. 13/543,688 (issued U.S. Pat. No. 9,337,752) titled "Interacting Complex Electric Fields and Static Electric Fields To Effect Motion" of Richard Banduric filed on Jul. 6, 2012, each hereby incorporated by reference for all that is disclosed as though fully set forth herein.

BACKGROUND

Electromagnetics is a vector based mathematical framework used in physics and electrical engineering. This mathematical framework can be considered to have two coupled fields known as the magnetic field and electric field. This mathematical framework was originally formulated in the 1860's to treat these fields as separate independent fields.

These separate fields have been shown to be coupled together by James Maxwell through the mathematical construct of the complex-quaternion. Einstein demonstrated that the electric field was a primary field and the magnetic force that the magnetic field that was created to describe these magnetic forces was really the results of the interaction of electric fields from charges in two different inertial frames of references in a conductor. This has created a mathematical framework that now is incomplete at describing all the forces from charges in relative motion that can be exploited.

BRIEF DESCRIPTION OF THE DRAWINGS

FIG. 5 illustrates a magnetic force between two conductors.

DETAILED DESCRIPTION

Complex electric fields and static electric fields to effect motion with conduction currents is disclosed. In an example, a method of using interacting electric fields from charges in conductors in different inertial reference frames to effect motion is disclosed. The example demonstrates a method of producing a force from an assembly of two conductors made of different materials that have different drift velocities for their mobile electric charges. The example method implements the mathematical framework that divides the electric fields from the charges in different inertial reference frames into separate electric field equations in electrically isolated conductors. The example method then implements the interaction of these electric fields to produce a force on an assembly to propel a spacecraft using electricity without any propellant.

Instead of using today's electromagnetic framework, the following equations can be implemented to effect motion from charges in different inertial reference frames.

Electric Field Equation:

$$\vec{E} = -\frac{\partial \vec{V}}{\partial t}\frac{\Phi}{c^2} - \nabla \times \frac{\vec{V}}{c}\Phi - \nabla\Phi \text{ Volts/Meter} \qquad \text{(EQN 1)}$$

Scalar Electric Potential Equation:

$$S = \frac{\partial}{\partial t}\frac{\Phi}{c} + \vec{\nabla} \cdot \frac{\vec{V}}{c}\Phi \text{ Volts/Second} \qquad \text{(EQN 2)}$$

This mathematical framework splits the electric fields from the electric charges in different inertial frames of references, into separate equations. To determine the forces between conductors these two sets of two equations are then coupled together by the medium that the charges reside in to create a force equation.

The magnetic field can be derived from these two sets of equations to mathematically describe the magnetic field when these charges are flowing through the medium of a wire conductor. These frameworks can be implemented to effect motion from electric currents in conductors in ways that can be implemented for spacecraft propulsion with electric currents only.

Before continuing, it is noted that the examples described herein are provided for purposes of illustration, and are not intended to be limiting. Other devices and/or device configurations may be utilized to carry out the operations described herein.

It is further noted that as used herein, the terms "includes" and "including" mean, but is not limited to, "includes" or "including" and "includes at least" or "including at least." The term "based on" means "based on" and "based at least in part on."

Figure 1A:
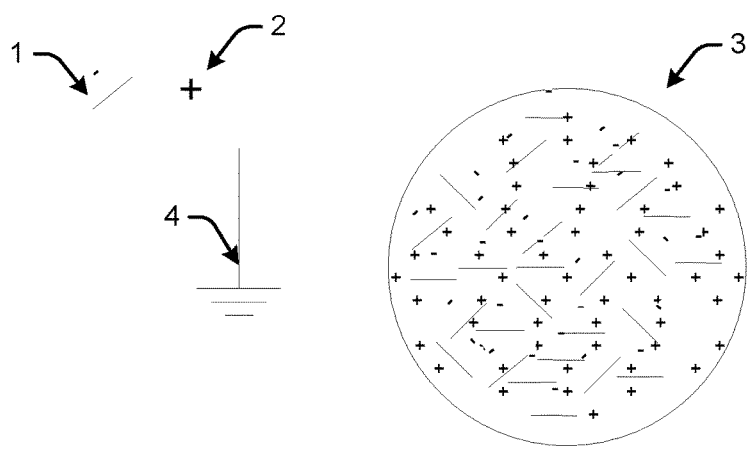
FIGS. 1A and 1B illustrate a wire conductor with no electric current, wherein (A) is a wire conductor end view, and (B) is a wire conductor side view.
Figure 1B:
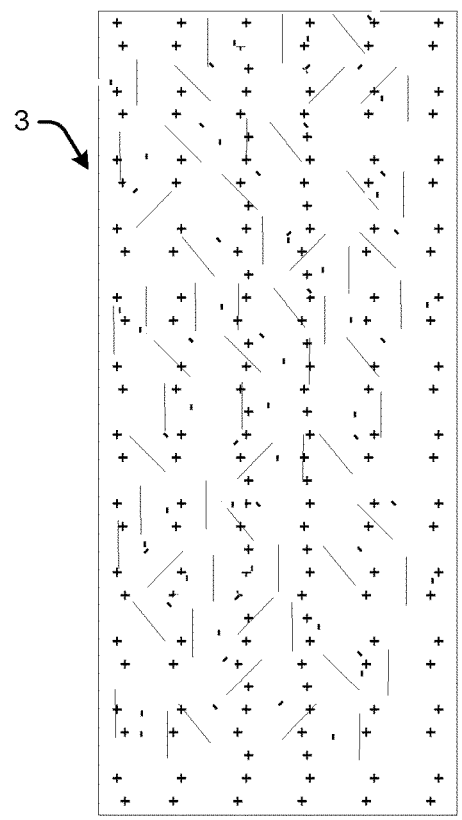

FIGS. 1A and 1B illustrate a wire conductor with no electric current, wherein (A) is a wire conductor end view, and (B) is a wire conductor side view. The moving negative electrons 1 and fixed positive charges 2 are illustrated in an uncharged wire conductor 3 with no electric current flowing through it. The wire conductor 3 has fixed atoms that have a static unpaired positive charge 2 from the unpaired proton that the mobile electron 1 leaves behind in copper that makes copper a conductor of an electric current. The unpaired positive charge 2 from the unpaired proton that is tightly coupled to the atomic structure of the wire conductor, while the mobile electron 1 is only coupled to the wire 3 by the electric charge of the wire 3 and the physical boundaries of the wire 3. In the inertial reference frame of the wire the positive charge 2 just has one term from the electric field equation (1) to describe its electric field that is represented by the protons static electric field.

Electric Field Equation for the Fixed Positive Charges 2 can be described as follows:

$$\vec{E}(+) = +\nabla \Phi \text{ Volts/Meter} \tag{EQN 3}$$

The mobile electrons 1 in a wire conductor 3 also have a static electric field that is modified by the effects of relativity. The electric field from these mobile electrons 1 is described mathematically by the electric field equation (1) as a static electric field that is modified by a Lorentz contracted term and a term to describe the acceleration of the electrons as they change direction in the wire 3.

$$\vec{E} = -\frac{\partial \vec{V}}{\partial t} \frac{\Phi}{c^2} - \nabla \times \frac{\vec{V}}{c} \Phi - \nabla \Phi \text{ Volts/Meter} \tag{EQN 4}$$

In addition, there is also a scalar electric potential term from equation (2) that is observed as the electrons 1 approach and recede from an observer of the wire. The random movements of the mobile electrons in the stationary wire offset each other and do not modify the static electric field of the wire 3, except to create noise in the electric field.

$$S(\text{Receding} -) = +\vec{\nabla} \cdot \frac{\vec{V}}{c} \Phi \text{ Volts/Second} \tag{EQN 5}$$

$$S(\text{Approaching} -) = -\vec{\nabla} \cdot \frac{\vec{V}}{c} \Phi \text{ Volts/Second} \tag{EQN 6}$$

The result of the interactions of the electric fields from the stationary positive charges 2 electric fields and the electric fields from the mobile electrons 1 is to give the wire conductor 3 a slightly negative charge when the wire conductor 3 has an equal number of free electrons 1 to the unpaired protons 2 in the atoms. The static electric fields of the negative electrons 1 and the positive charges 2 from the unpaired protons follow the rules of superposition and sum to 0.

$$0 = +\nabla \Phi(\text{protons}) - \nabla \Phi(\text{electrons}) \text{ Volts/meter} \tag{EQN 7}$$

The resulting electric field that is observed from the wire conductor is from changes to electric field of mobile electrons 1 from the effects of the Lorentz contraction of the negative electric charge 1.

$$\vec{E}(\text{Wire}) = -\nabla \times \frac{\vec{V}}{c} \Phi \text{ Volts/meter} \tag{EQN 8}$$

Equation (8) increases the negative electric fields from the motion of the electrons 1 that are observed perpendicular to their motion and as such may not follow all the rules of superposition. The increase in the electric field from the moving electron 1 is from the effects of relativity from the Lorentz contraction that is observed from the moving electrons. This forces the negative charge density of the wire to be greatest near the outside of the wire and the ends of the wire.

The changes to the electric field equation for the free electrons 1 due to the acceleration of the electrons 1 are modeled by the following equation.

$$\vec{E}(\text{Wire}) = -\frac{\partial \vec{V}}{\partial t} \frac{\Phi}{c^2} \text{ Volts/meter} \tag{EQN 9}$$

The electric field from equation (9) is observed from the electrons 1 as they change velocity inside the conductor 3 that is material and physical shape dependent.

The wire conductor 3 retains a negative charge 1 until the wire 3 comes in contact with the earth ground 4. Some of the negative charge 1 moves to earth ground 4 and the wire conductor 3 have a slight deficit in negative charge 2, to give it a neutral or no total electric field.

Figure 2:
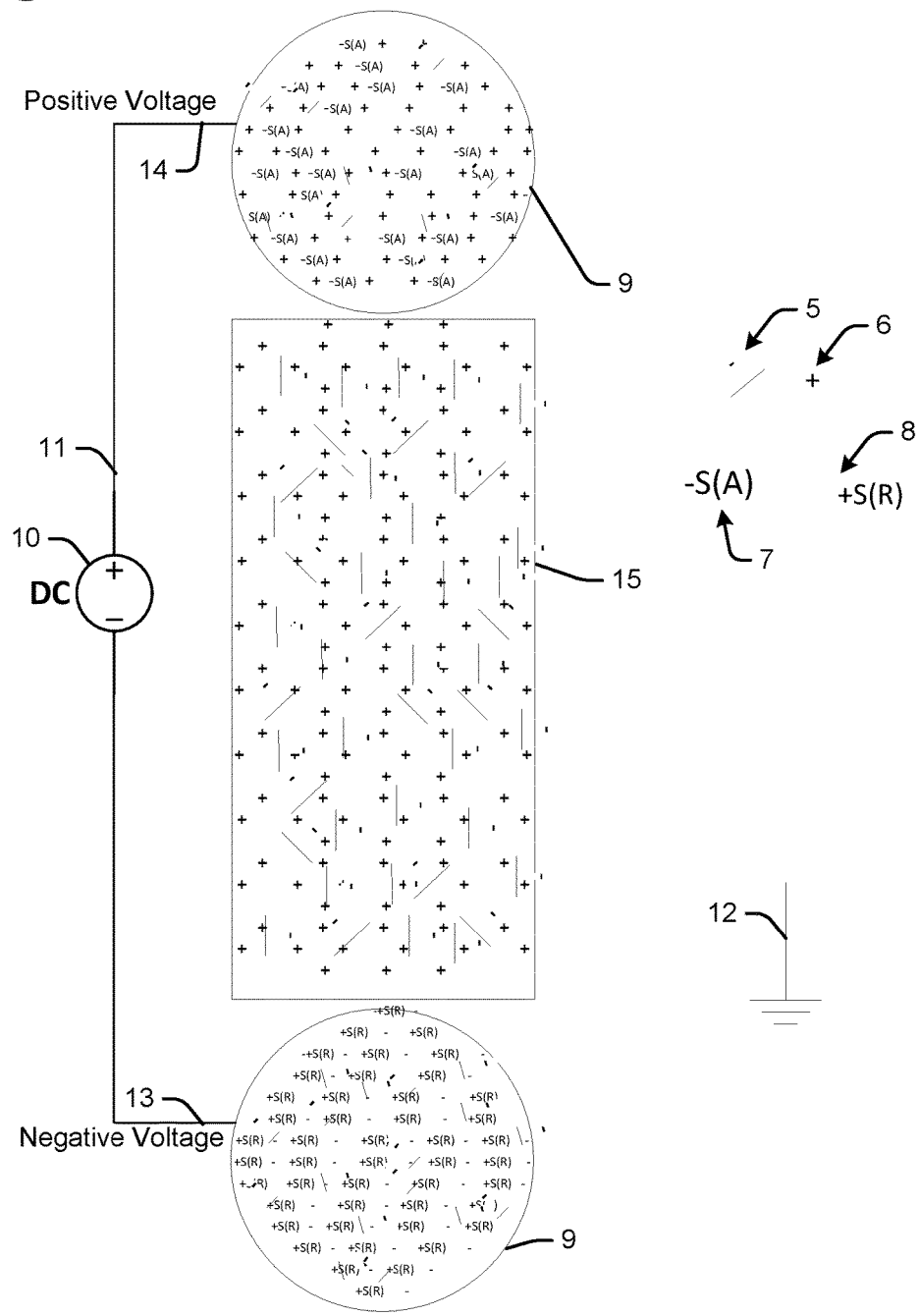
FIG. 2 illustrates a round wire with an electric current.

FIG. 2 illustrates the moving negative electrons 5 when a voltage source 10 is applied to the wire 9, 15 with the negative potential 13 on the bottom side of the wire 9 and a positive potential 14 is applied to the top side of the wire 9.

The side view of the wire 15 observes the electric field from the moving electrons 5 to increase from the effects of relativity, as the electrons drift to the positive end of the wire as an electric current. When the positive charge's 6 electric fields and the moving negative charge's 5 electric fields are coupled together inside of a wire conductor 15 the difference in the two charges electric fields are observed as the magnetic force that is described by the magnetic field using todays vector equations that were derived from Maxwell's equations.

The edge of the ends of the wire 9 allow the receding +S(R) 8 and approaching −S(A) 7 scalar potential to be observed as a decrease and increase in the electric field at the ends of the wire that can be measured with a static electric field meter.

Figures 3A, 3B:
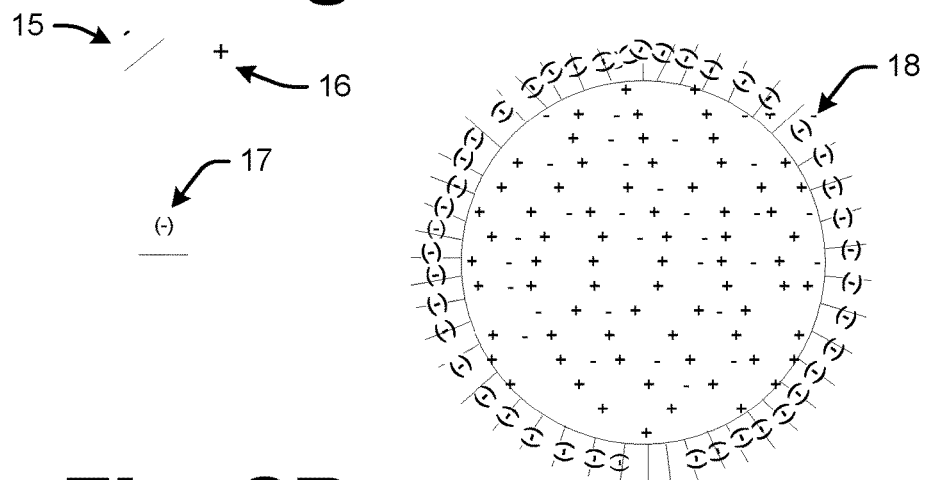
FIGS. 3A and 3B illustrate an electric field from a round wire with an electric current, wherein (A) is a wire conductor end view, and (B) is a wire conductor side view.

FIGS. 3A and 3B illustrate an electric field from a round wire with an electric current, wherein (A) is a wire conductor end view, and (B) is a wire conductor side view. The moving negative electrons 15 electric field change 17 are illustrated from their motion from a round wire 18. The total electric field is composed of the static electric field 16 from the fixed positive charges represented by equation (10).

$$E(+) = +\nabla \Phi \frac{\text{Volts}}{\text{Meter}} \tag{EQN 10}$$

The electric fields from the negative electrons that compose the electric current are represented by equation (11).

$$\vec{E}(-) = -\nabla \times \frac{\vec{V}}{c} \Phi - \nabla \Phi \frac{\text{Volts}}{\text{Meter}} \tag{EQN 11}$$

The electric fields from the two different charges follow a subset of the rules of superposition due to the charges being physically coupled together in the stationary wire and sum together as represented by equation (12).

⊥=Viewed perpendicular to the charges motion
∥=Viewed parallel to the charges motion $$\vec{E}(\perp, \|) = +\nabla \Phi(\text{Positive}) - \nabla \Phi(\text{Negative}) \frac{\text{Volts}}{\text{Meter}} \quad \text{(EQN 12)}$$

The resulting difference electric field 17 is observed outside the wire 18 when the wire is viewed perpendicular to the electric current direction, and is represented by equation (13).

$$\vec{E}(\perp) = -\nabla \times \frac{\vec{V}}{c} \Phi \frac{\text{Volts}}{\text{Meter}}, \vec{E}(\|) = 0 \quad \text{(EQN 13)}$$

The resulting electric field 17 that is observed from the wire is the electric field component that produces the magnetic field from a wire. Conversion of the resulting electric field 17 to a magnetic field is illustrated by equations (14), (15), (16), and (17).

$$\Phi = \frac{\text{Charge}}{4\pi\varepsilon_0 r^2} \text{ Volts}, \vec{A} = \frac{\mu_o \vec{I}}{4\pi} \text{ Amperes}, \mu_o = 1/(\varepsilon_o c^2) \quad \text{(EQN 14)}$$

The equations (14) define the spherical charge and the electric current 15 from that spherical charge as Amperes. These equations are coupled together by the constants $u_o$ and $\varepsilon_o$ through the speed of light "c".

$$\vec{I} = \text{Charge} \frac{\text{Coulombs}}{\text{Seconds}} \text{ or Amperes} \quad \text{(EQN 15)}$$

The equation (15) is the definition of the electric current 15 as a spherical charge flowing through a two-dimensional area of a round conductor.

$$-\nabla \times \frac{\vec{V}}{c} \Phi \frac{\text{Volts}}{\text{Meter}} = -\nabla \times \frac{\vec{V}}{c} \left( \frac{\text{Charge}}{4\pi\varepsilon_0 r^2} \right) = \left[ \frac{\mu_o \vec{I}}{4\pi} \frac{1}{\varepsilon_o c^2} \right] = \vec{A} \quad \text{(EQN 16)}$$

Equation (16) converts the difference electric field 17 from the moving charge into the magnetic potential that is created from a spherical charge flowing through a round wire 18 as an electric current 15.

$$\vec{B} = \nabla \times \vec{A} \text{ Volt} \cdot \frac{\text{Second}}{\text{Meter}} \text{ or Tesla} \quad \text{(EQN 17)}$$

Equation (17) converts the magnetic vector potential to the magnetic field. But the conversion is based on the properties of a copper wire conductor 18 that is just a special case that is not valid if these physical properties or material that the electric current flows through is different.

Figure 4:
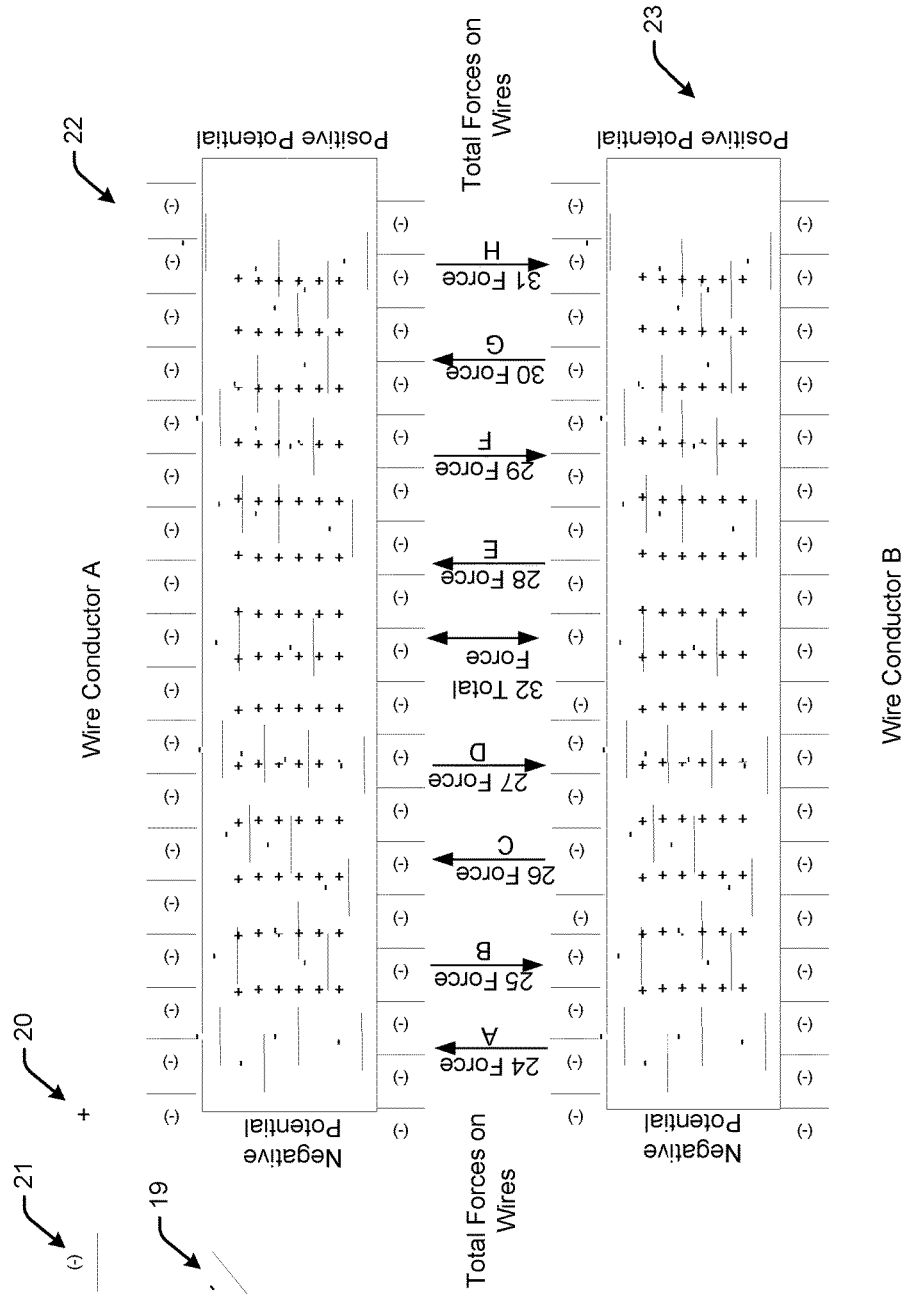
FIG. 4 illustrates an electric force between two round conductors with an electric current.
Figure 6A:
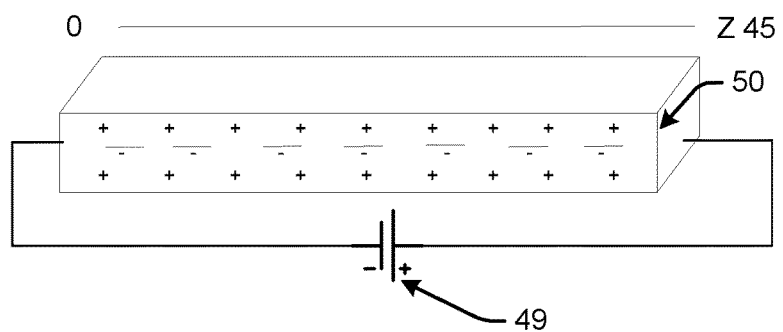
FIGS. 6A, 6B, 6C and 6D illustrate square conductors having an electric field with a current, wherein (A) is a square conductive wire with an electric current with flat faces, (B) is a square wire end view, (C) is a square wire side view, and (D) is a round wire end view.
Figure 6D:
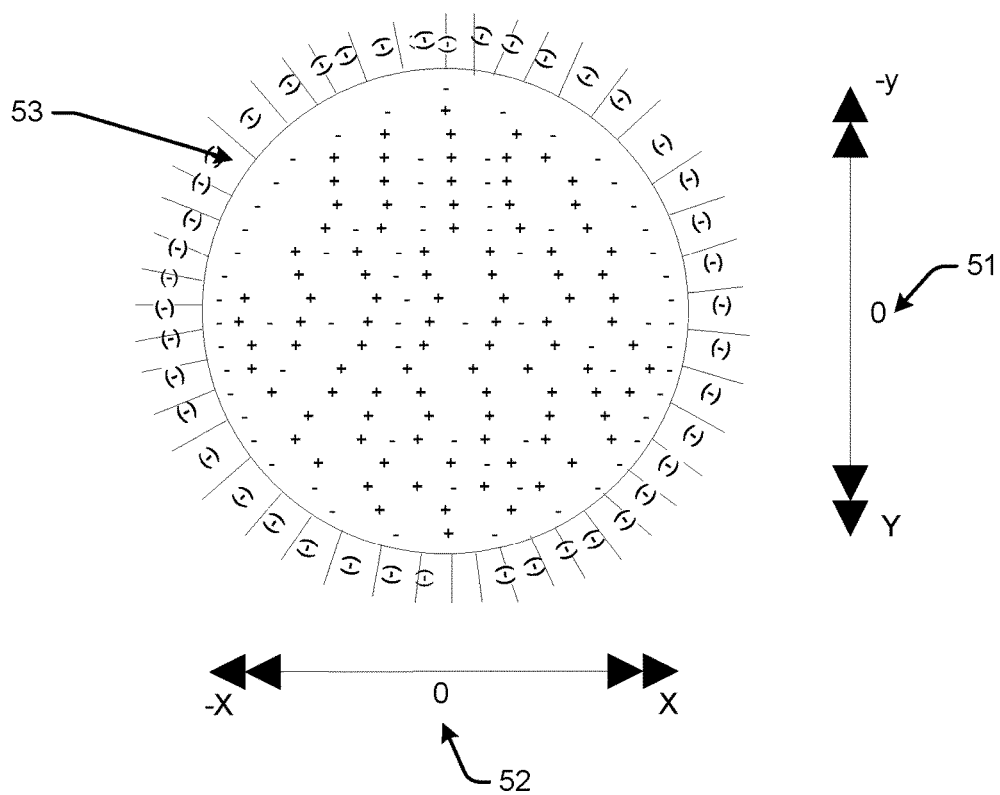
Figure 6B:
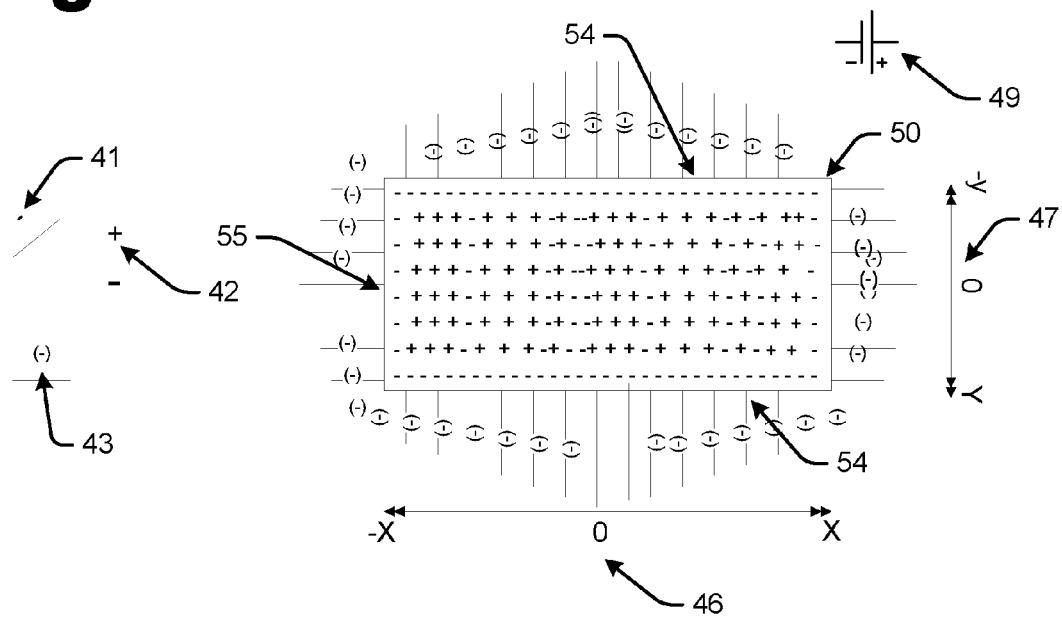
Figure 6C:
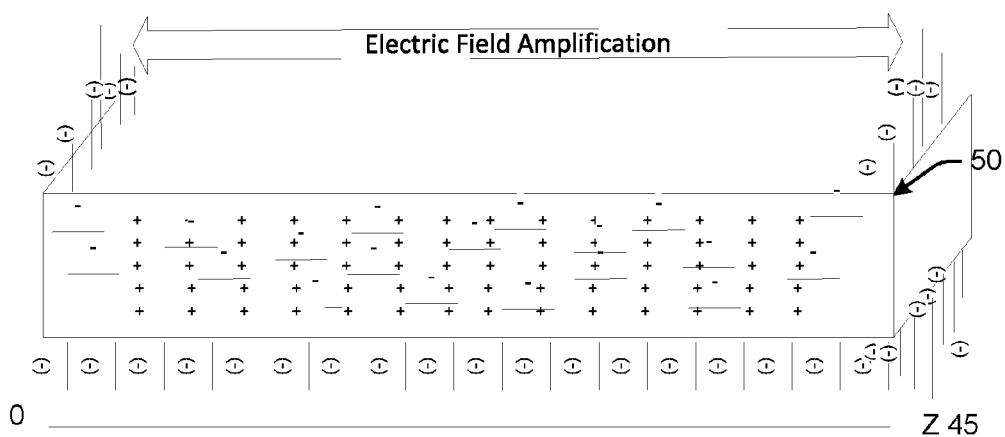

FIG. 4 illustrates mathematically the relativistic electric field 21 interactions between two wire conductors 22, 23 with an electric current 19 that are in close proximity of each other. The moving negative 19 charges interact with the positive stationary positive charges 20 in the wires to produce a force 32 between these wires.

When Wire A 22 has an electric current 19 flowing through it that produces a positive electric field from the stationary positive charges 20 and a negative electric field 21 from the moving negative charges 19. Wire B 23 has the same two types of electric fields. These electric fields are in two physical objects 22, 23 of the same material and shape, so a subset of the rules of superposition mathematically extract a set of magnetic forces that can be modeled in the mathematical framework that describes the magnetic force from a magnetic field.

If the resulting force on the wires 32 is determined from the interactions of these different electric fields, instead of using the framework based on the magnetic field, we have a framework that describe the forces observed from conductors 22, 23.

Determining forces on these wires allow us to take into account the materials and shape of the wires to determine the total forces on the wires.

Total force on wire A 22 can be described by four electric field interactions with wire B 23 that produces four forces on wire A as separate forces 24, 25, 26, 27 that can be represented as:

$$\vec{F_A} + \vec{F_s} + \vec{F_c} + \vec{F_o} = \text{Total force on wire } A \quad \text{(EQN 18)}$$

Repulsive force on Wire A 22 from the electric field interactions from the positive charges in wire A 22 with the positive charges in wire B 23 can represented as:

$$\vec{F_A} = \vec{F}[\vec{E}_{\text{Wire }A(+)} <=> \vec{E}_{\text{Wire }B(+)}] \quad \text{(EQN 19)}$$

Attractive force on Wire A 22 from the electric field interactions from the positive charges in wire A 22 with the moving negative charges in wire B 23 can represented as:

$$\vec{F_s} = \vec{F}[\vec{E}_{\text{Wire }A(+)} >=< \vec{E}_{\text{Wire }B(-)}] \quad \text{(EQN 20)}$$

Repulsive force on Wire A 22 from the electric field interactions from the moving negative charges in wire A 22 with the moving negative charges in wire B 23 can represented as:

$$\vec{F_c} = \vec{F}[\vec{E}_{\text{Wire }A(-)} <=> \vec{E}_{\text{Wire }B(-)}] \quad \text{(EQN 21)}$$

Attractive force on Wire A 22 from the electric field interactions from the moving negative charges in wire A 22 with the positive charges in wire B 23 can represented as:

$$\vec{F_o} = \vec{F}[\vec{E}_{\text{Wire }A(-)} >=< \vec{E}_{\text{Wire }B(+)}] \quad \text{(EQN 22)}$$

Then the total force on wire B 23 is described by four electric field interactions with wire A 22 that produces 4 separate forces 28, 29, 30, 31 on wire B 23 that can be represented as:

$$\vec{F_A} + \vec{F_A} + \vec{F_A} + \vec{F_A} = \text{Total force on wire } B \quad \text{(EQN 23)}$$

Repulsive force on Wire B 23 from the electric field interactions from the positive charges in wire A 22 with the positive charges in wire B 23 can represented as:

$$\vec{F_A} = \vec{F}[\vec{E}_{\text{Wire }B(+)} <=> \vec{E}_{\text{Wire }A(+)}] \quad \text{(EQN 24)}$$

Attractive force on Wire B 23 from the electric field interactions from the positive charges in wire A 22 with the moving negative charges in wire B 23 can represented as:

$$\vec{F_A} = \vec{F}[\vec{E}_{\text{Wire }B(+)} >=< \vec{E}_{\text{Wire }A(-)}] \quad \text{(EQN 25)}$$

Repulsive force on Wire B 23 from the electric field interactions from the moving negative charges in wire A 22 with the moving negative charges in wire B 23 can represented as:

$$\vec{F_A} = \vec{F}[B(-) <=> \vec{E}_{\text{Wire }A(-)}] \quad \text{(EQN 26)}$$

Attractive force on Wire B 23 from the electric field interactions from the moving negative charges in wire A 22 with the positive charges in wire B 23 can represented as:

$$\vec{F_A} = \vec{F}[\vec{E}_{Wire\,B}(-) >= <\vec{E}_{Wire\,A}(+)]$$ (EQN 27)

Determining the forces on these wires as 8 separate force vectors allows these same forces to be modeled mathematically as a special case of a mathematical framework, with the simpler mathematical framework of a magnetic field with a magnetic force if the wires 22, 23 are made of the same shape and made of the same material. If the wires 22, 23 are of different shapes or made of different materials, the force on Wire A is different than the force on Wire B.

FIG. 5 illustrates mathematically the forces on two wires 36, 37 of the same shape and made of the same materials using the mathematical framework that physics has created to model magnetic forces from wire conductors 36, 37. The magnetic forces 38 that are described by these equations are based on $4\pi$ and the permeability constant in electromagnetics.

The total force on wire A 36 is determined by the equations:

$$\vec{F}_{WireA} = \frac{\mu_o \vec{I}_A \vec{I}_B}{2\pi} \frac{2}{D} L_A \text{ Newtons}, \vec{I}_A 41, \vec{I}_B 42$$ (EQN 28)

$L_x$=Length of Wire 40 $D$=Distance between Wires 39 (EQN 29)

The total force on wire B 37 is determined by the equation:

$$\vec{F}_{WireB} = \frac{\mu_o \vec{I}_A \vec{I}_B}{2\pi} \frac{2}{D} L_A \text{ Newtons}$$ (EQN 30)

The total force between each of the wires 36, 37 is then:

$$38\, \vec{F}_{Total} = \vec{F}_{Wire\,A} + \vec{F}_{Wire\,B}$$ (EQN 31)

The total force on the wires is then:

$$38\vec{F}_{Total} = \frac{\mu_o \vec{I}_A \vec{I}_B}{2\pi D} L \text{ Newtons}$$ (EQN 32)

These forces 38 can be represented as interactions of electric fields from charges in different inertial reference frames that do not follow the rules of superposition.

The force on wire A 36 is:

$$\vec{F}_{WireA} = -\nabla \times \frac{\vec{V_A}}{c}\left[\frac{\mu_o \vec{I}_B}{4\pi} \frac{1}{\varepsilon_o c^2}\right]\frac{2}{D} L_A = -\nabla \times \frac{\vec{V_A}}{c} \frac{Q_B}{4\pi\varepsilon_0 r} \frac{2\vec{I}_B}{D} L_A$$ (EQN 33)

$$\vec{F}_{WireA} = -\nabla \times \frac{\vec{V_A}}{c} \Phi_B \frac{2\vec{I}_B}{D} L_A$$ (EQN 34)

The force on wire B 37 is:

$$\vec{F}_{WireB} = -\nabla \times \frac{\vec{V_B}}{c}\left[\frac{\mu_o \vec{I}_A}{4\pi} \frac{1}{\varepsilon_o c^2}\right]\frac{2}{D} L_B = -\nabla \times \frac{\vec{V_B}}{c} \frac{Q_A}{4\pi\varepsilon_0 r} \frac{2\vec{I}_A}{D} L_B$$ (EQN 35)

$$\vec{F}_{WireB} = -\nabla \times \frac{\vec{V_B}}{c} \Phi_B \frac{2\vec{I}_A}{D} L_B$$ (EQN 36)

For the forces from these equations to determine the forces observed from wire conductors 36, 37, the velocity of the charges is fixed at velocities in the range of 1 cm/sec that is for copper conductors.

The constants $\mu$ (Permeability) and $4\pi$ are derived from the shape of wire conductors 36, 37 and the characteristics of the copper conductor, similar to the drift velocity of 1 cm/sec that defines a constant. If wires materials are changed to a different material (e.g., Graphene, Nichrome, or a Superconductor), with different drift velocities for the negative charges, these materials may need a correction factor to determine the forces on these wires 36, 37 made of these different materials to determine the forces observed on these wires.

The shape is not represented in the mathematical framework based on the magnetic field that describe magnetic forces. The mathematical framework based on the magnetic field does not differentiate the forces observed from a cylindrical wire or a flat wire with the same amount of current for the same wire cross sectional area.

FIGS. 6A, 6B, 6C and 6D illustrate conductors having an electric field with a current, wherein (A) is a square conductive wire with an electric current with flat faces, (B) is a square wire side view, (C) is a square wire end view, and (D) is a round wire end view. The figures illustrate graphically the relativistic changes in the electric field of a graphene conductive square wire 50 with flat faces that has an electric current. The negative electric current 41 is in a different inertial frame of reference than the positive charges 42 in the wire that results in a difference relativistic electric field 43 that has been represented by the mathematical framework as the magnetic field.

The mathematics that model the forces from a round wire 53 using the magnetic field predict that the square wire 50 with an electric current 41 experience the same magnetic force on the round wire 53 with the same electric current observed with the square wire 50.

Instead of representing the forces between a square wire 50 and a round wire 53 by using the magnetic field, the forces are determined as the interaction of two electric fields 43 from two different charges 42, 41 in two different inertial frames of reference in the two different physical objects 50, 53 interacting to produce the two forces on the objects.

We now have the difference relativistic electric fields 43 from the wires that do not follow all the rules of superposition that is the basis for the magnetic force. This allows the two wires to observe different electric fields that are different from a square wire 50 and round wire 53 that results in different forces observed by the round wire 53 as compared to the square wire 50.

The negative electric current that is flowing along the length 45 of the wire 50 from left to right along the Z axis 45. The moving negative charges 41 distribute themselves evenly on the flat faces 54, 55 of the wire 50 as represented as the X axis and Y axis 46, 47. The negative charges 41 distribute themselves evenly to keep the electric field in the wire at 0 in the moving reference frame of the negative charges 41.

The negative electric charges 41 are physically coupled to the stationary reference frame of the wire 50. Yet the electric field 43 of the negative moving charges 41 increase in intensity when observed perpendicular to their motion from the stationary reference frame due to the effects of relativity known as the Lorentz contraction of the charges.

The increase in the electric field 43 observed from the stationary reference frame of the wire from the motion of the negative electric charges 41, is geometrically amplified (e.g., similar to a uniform line charge amplified across its length). The equation for the electric field of a line charge is mathematically described below:

$L$ = Length of Uniformly Charged Wire in Meters
$x$ = Position from center of Wire from $-\frac{L}{2}$ to 0 to $\frac{L}{2}$ Meters
$D$ = Distance Perpendicular from Wire in Meters
$y = \Lambda_q$ = Charge Density in Coulombs/Meter $$E(x) = \frac{y}{2\pi\epsilon_o D}\left(\frac{L}{\sqrt{\left(D^2 + \left(\frac{L}{2}\right)^2\right)}} - \frac{2x}{\sqrt{(D^2 + x^2)}}\right) \text{Volts/Meter} \quad \text{(EQN 37)}$$

The faces of the square wire 54, 55 experience geometric amplification of the electric field intensity increase 43 from the charges motion along the Z axis 45 that is perpendicular to the direction of the electric current on the X and Y 46, 47 axis's that is modeled as a line charge of a uniformly charged wire.

The integration of the line charge to get the electric field 43 produce an electric field that is greatest at the center of the faces of the flat wire 54, 55 that is perpendicular to the electric current direction.

$w_x, w_y$ = Width of Wire Faces 54, 55 in Meters
$x, y$ = Position from center of Faces 46, 47 in Meters
$D$ = Perpendicular Distance from face in Meters
$\Lambda_{iq}$ = Charge Density in Coulombs/Meter $$\Lambda_{iq} = -\times \frac{\vec{V}_z}{c}\Lambda_q \text{ Volts/Meter} \quad \text{(EQN 38)}$$

$$E(x) = \frac{\Lambda_{iq}}{2\pi\epsilon_o D}\left(\frac{w_x}{\sqrt{\left(D^2 + \frac{w_x^2}{2}\right)}} - \frac{2x}{\sqrt{(D^2 + x^2)}}\right)\frac{\text{Volts}}{\text{Meter}} \quad \text{(EQN 39)}$$

$$E(y) = \frac{\Lambda_{iq}}{2\pi\epsilon_o D}\left(\frac{w_y}{\sqrt{\left(D^2 + \frac{w_y^2}{2}\right)}} - \frac{2y}{\sqrt{(D^2 + y^2)}}\right)\frac{\text{Volts}}{\text{Meter}} \quad \text{(EQN 40)}$$

The round wire 53 does not experience this amplification of the electric field 43 around the circumference of the wire. Instead, the increase of the electric field due to the charges motion are only described by the equation:

$$E(x) = \frac{-\nabla \times \frac{\vec{V}_z}{c}\Lambda_q}{2\pi\epsilon_o D} \frac{\text{Volts}}{\text{Meter}} \quad \text{(EQN 41)}$$

These differences in the electric fields from these different relativistic electric fields for a round wire 53 and a square wire 50 can create a difference force that can be implemented to propel a spacecraft in space as one application.

The requirements to produce different forces the two different wires are that the wires have to have different shapes and/or made of different materials with different drift velocities and/or charge distributions and powered by two separate electrically isolated power sources.

The moving electric charges that are the electric current are in different inertial reference frames. The reason is the electric fields from charges in the same inertial reference frame follow the rules of superposition. Electric fields from charges in different inertial reference frames do not follow the rules of superposition. The difference is the basis for the magnetic field from conductors flowing electric currents.

Figure 7A:
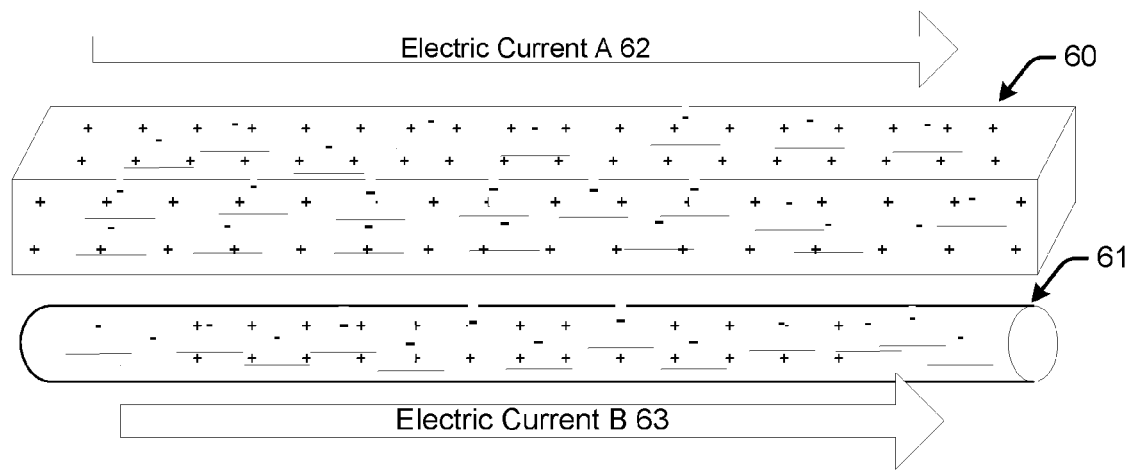
FIGS. 7A and 7B illustrate interacting electric fields from two conductors, wherein (A) is a wire conductor side view, and (B) is a wire conductor end view.
Figure 7B:
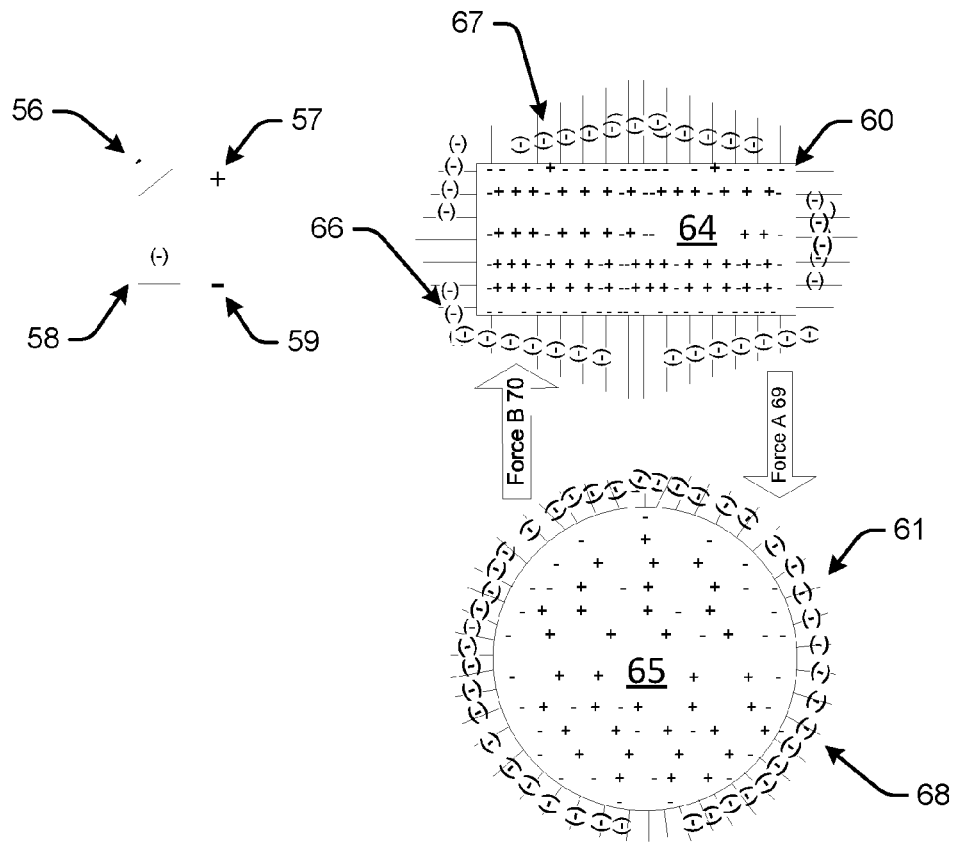

FIGS. 7A and 7B illustrate interacting electric fields from two conductors, wherein (A) is a wire conductor's side view, and (B) is a wire conductor's end view. In FIG. 7A, a square conductive graphene wire with flat faces and a tubular copper wire are shown flowing an electric current. In FIG. 7B, Force A 69 is unequal to Force B 70.

The figures illustrate two parallel wires 60, 61 with an electric current 62 in a square wire 60 that is parallel to a round copper wire 61 with an electric current 63. The end view of the wires 64, 65 shows the electric fields from charges 56, 57 moving at different drift velocities or in different inertial reference frames. If the wires 64, 65 had the same drift velocities the difference electric fields for the charges in the same inertial reference frame obey the rules of superposition and merge into one electric field. Since the charges drift velocity is different for graphene and copper the difference electric fields 66, 67, 68 from the wires 60, 61 do not follow the rules of superposition. Instead the rules of superposition are only valid for the electric fields from charges in the same inertial reference. This results in the positive charges 57 in the two wires 60, 61 observing two different total electric fields 66, 67, 68 from the other wire. This causes the forces 69, 70 that the two wires to observe from each other to be different.

Figure 8A:
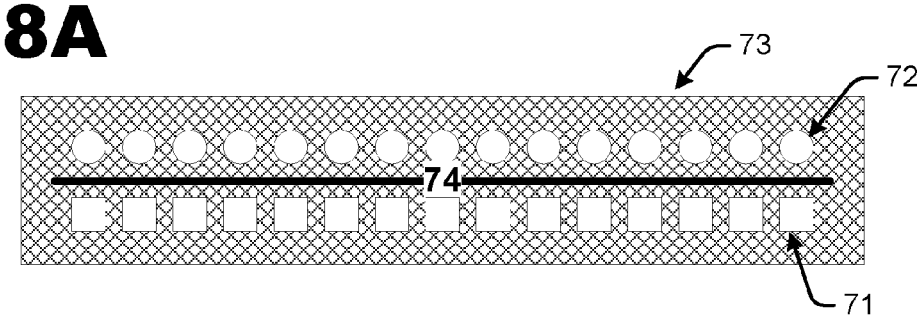
FIGS. 8A, 8B and 8C illustrate a cutaway view of an example assembly of two planes of wire conductors with power supplies and wiring diagram, wherein (A) is an edge view of the wires in a non-conductive frame, (B) is a top view of round wires in a non-conductive frame, and (C) is a top view of square wires in a non-conductive frame.
Figure 8B:
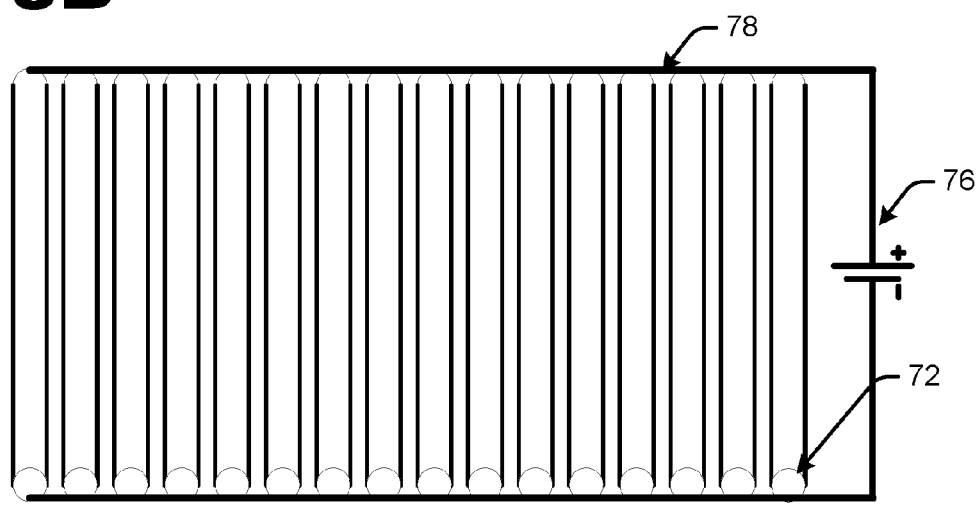
Figure 8C:
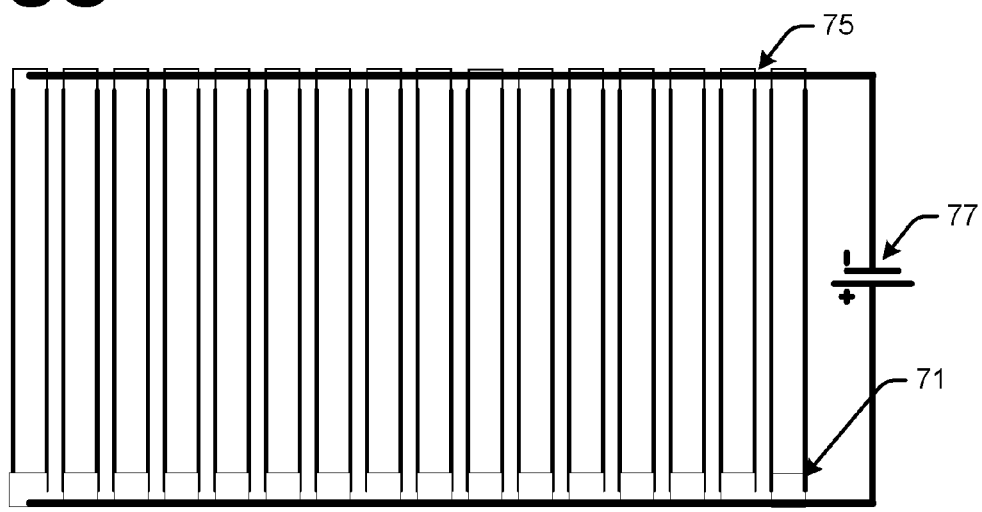

FIGS. 8A, 8B and 8C illustrate a cutaway view of an example assembly of two planes of wire conductors with power supplies and wiring diagram, wherein (A) is an edge view of the wires in a non-conductive frame, (B) is a top view of round wires in a non-conductive frame, and (C) is a top view of square wires in a non-conductive frame. The figures illustrate graphically an edge view of a sheet of square of round copper wires 72 and square wires 71 with flat faces made of two different materials in a nonconductive frame 73. The round copper wires 72 and square graphene wires 71 are electrically isolated from each other by a non-conducting sheet 74 as an example of a sheet of Kapton.

The wires are powered by electrically isolated power supplies 76, 77. The physical diagram and schematic of the top sheet of the wires 78 diagrams the wires being powered in parallel by power supply 76. The schematic of the bottom sheet of the wires 75 diagrams the wires being powered in parallel by power supply 77 with the electric current flowing in the opposite direction as the top sheet.

Figure 9:
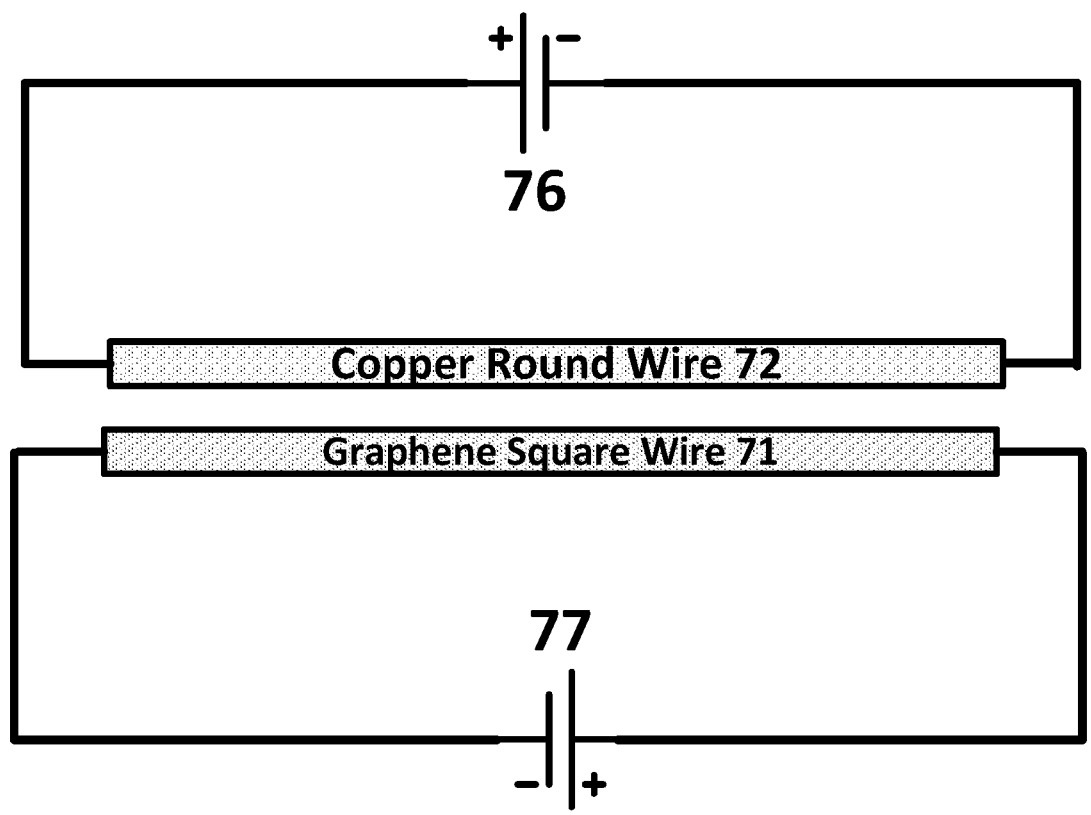
FIG. 9 illustrates an example electrical schematic of two planes of wire conductors with power supplies

FIG. 9 illustrates the electrical schematic of the electrical circuit that powers the two sheets of conductors 72, 71. The copper wires 72 and graphene wires 71 are powered by separate electrically isolated power supplies 76, 77. The electric currents from the battery 76 that supplies electric current to the round copper wires 72 is physically in the opposite direction from the electric current from battery 77 that supplies the electric current to the graphene wires 71. The electric currents from the battery 76 that supplies electric current to the round copper wires 72 can also be in the same direction as the electric current from battery 77 that supplies the electric current to the graphene wires 71 to create different opposite forces on the wires 72 and 71.

Figure 10:
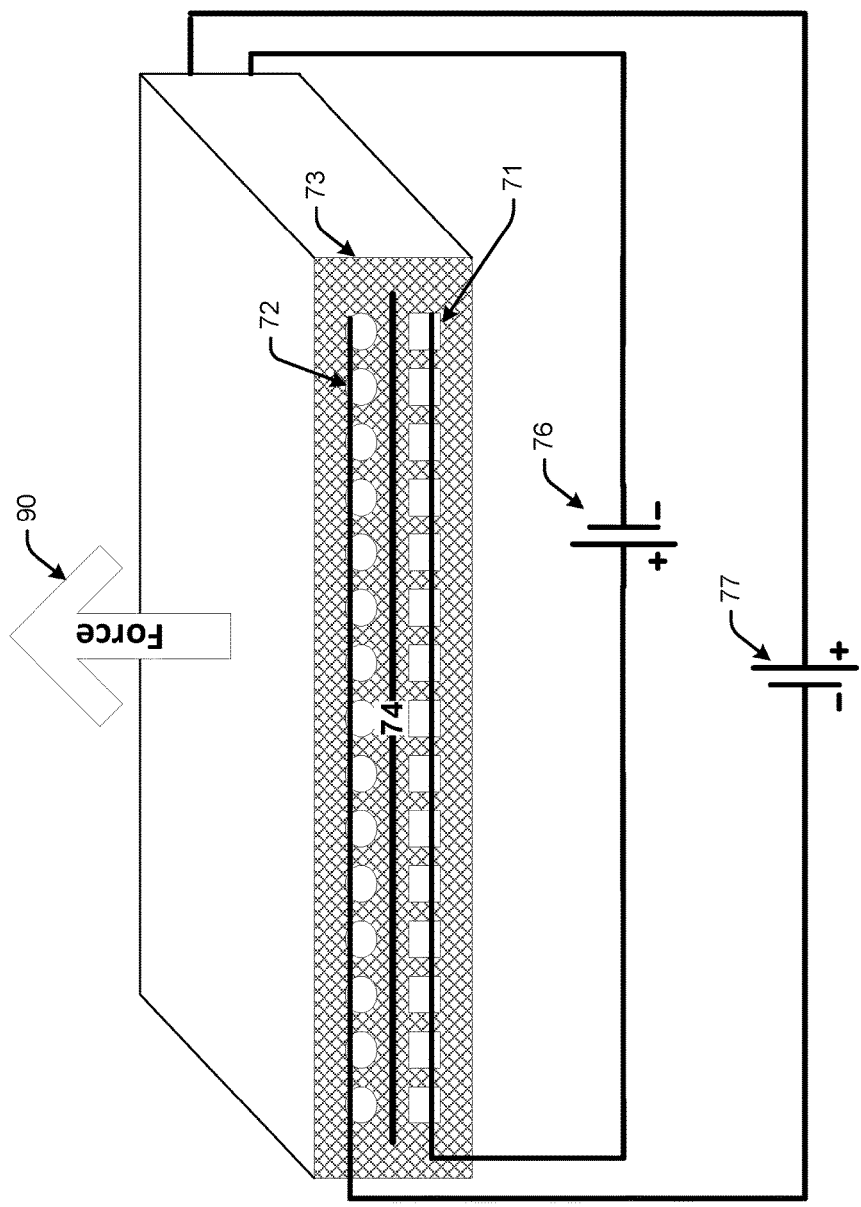
FIG. 10 illustrates an example assembly that is powered producing an external force.

FIG. 10 illustrates an assembly 73 with an electric current in two different directions from two isolated batteries 76, 77 through two different wire conductors 71, 72. The two planes of conductors have different electric fields from the motions of the electrons in wires that do not follow the rules of superposition such that the wires observe different electric fields from the other sheet of wires.

These two different electric fields result in different forces to be observed from the two sheets of wires 71, 72. This then results on a force 90 on the assembly that only requires the assembly to be powered by two isolated by independent power supplies.

The power supplies that power the conductors have to be physically and electrically isolated from each other. The conductors must have no external connections to ground or any conductor that connects to an external object outside the assembly. The conductors cannot connect to ground or together after they are powered through another conductor.

The round tubular wire may be replaced with other types of wire shapes that do not geometrically amplify or geometrically amplify on different surfaces the electric changes electric fields due to relative motion of the charge carriers. Examples include, but are not limited to, conductive spheres or half spheres, conductive ovals, conductive u shaded wires or thin flat wires that are perpendicular to the flat faces of the square wires. The square wires may be replaced with thin flat wires that have their flat faces near the round or tubular wires.

The resulting force 90 can be implemented to propel spacecraft using electricity only. The same force can also be implemented for any propulsion by a force to move an object with electricity in a vacuum or in any medium.

It is noted that the examples shown and described are provided for purposes of illustration and are not intended to be limiting. Still other examples are also contemplated.

The invention claimed is:

1. A method comprising:
producing a force on a surface by the interaction of differences of electric fields from charges in relative motion in a conductor from paired conductors with different physical characteristics, wherein the paired conductors are powered by independent electrically isolated electrical power sources.

2. The method of claim 1, wherein the paired conductors have different shapes.

3. The method of claim 1, wherein the paired conductors are made of different materials that have different electron drift velocities.

4. The method of claim 1, wherein the paired conductors are made of different materials that have different charge densities.

5. The method of claim 1, wherein the paired conductors have different charge mobilities.

6. The method of claim 1, wherein the paired conductors are positioned next to each other.

7. The method of claim 1, wherein the paired conductors are made of different conductive or semi-conductive materials.

8. The method of claim 1, wherein the paired conductors are in relative motion relative to one another.

9. The method of claim 1, wherein the paired conductors are stationary.

10. The method of claim 1, wherein the paired conductors do not contact other conductors or ground after being electrically powered.

11. A system comprising:
a first conductor of a first shape, the first conductor made of a first type of conductive material; and
a second conductor of a second shape that is different than the first shape, the second conductor made of a second conductive material that is different than the first type of conductive material, wherein the first and second conductors are powered by independent electrically isolated electrical power sources.

12. The system of claim 11, wherein the power sources and wire connections to the first and second conductors are in the same inertial reference frame as the conductors that they are attached to.

13. The system of claim 11, wherein the first and second conductors are electrically conductive and have different internal structures.

14. The system of claim 11, wherein the first and second conductors are provided within a non-conductive assembly.

15. The system of claim 11, wherein the first and second conductors move at different velocities.

16. The system of claim 11, wherein the first and second conductors are accelerated at different rates.

17. A method comprising producing an independent force when an electric current is flowing through two different conductors, wherein the two different conductors are powered by independent electrically isolated electrical power sources.

18. The method of claim 17, further comprising producing a force when an electric potential is applied to the two different conductors.

19. The method of claim 17, further comprising producing a greater force when the conductive wire sheets are separated by a material with a high dielectric constant.

* * * * *